(12) United States Patent
Brauer

(10) Patent No.: US 10,964,016 B2
(45) Date of Patent: Mar. 30, 2021

(54) COMBINING SIMULATION AND OPTICAL MICROSCOPY TO DETERMINE INSPECTION MODE

(71) Applicant: KLA-TENCOR CORPORATION, Milpitas, CA (US)

(72) Inventor: Bjorn Brauer, Beaverton, OR (US)

(73) Assignee: KLA-Tencor Corporation, Milpitas, CA (US)

( * ) Notice: Subject to any disclaimer, the term of this patent is extended or adjusted under 35 U.S.C. 154(b) by 35 days.

(21) Appl. No.: 16/295,715

(22) Filed: Mar. 7, 2019

(65) Prior Publication Data

US 2019/0287232 A1 Sep. 19, 2019

Related U.S. Application Data

(60) Provisional application No. 62/642,161, filed on Mar. 13, 2018.

(51) Int. Cl.
*G06T 7/00* (2017.01)

(52) U.S. Cl.
CPC .... *G06T 7/001* (2013.01); *G06T 2207/10056* (2013.01); *G06T 2207/20224* (2013.01); *G06T 2207/30148* (2013.01); *G06T 2207/30168* (2013.01)

(58) Field of Classification Search
CPC combination set(s) only.
See application file for complete search history.

(56) References Cited

U.S. PATENT DOCUMENTS

| 6,177,993 | B1 | 1/2001 | Sommargren | |
|---|---|---|---|---|
| 7,570,797 | B1* | 8/2009 | Wang | G01N 21/9501 250/559.45 |
| 10,192,302 | B2* | 1/2019 | Brauer | G06K 9/6202 |
| 2007/0230770 | A1* | 10/2007 | Kulkarni | H01L 21/67005 382/149 |
| 2008/0040053 | A1* | 2/2008 | Plotnikov | G01N 27/9046 702/38 |
| 2008/0049219 | A1 | 2/2008 | Kim et al. | |
| 2010/0188657 | A1* | 7/2010 | Chen | G01N 21/9501 356/237.5 |
| 2011/0286656 | A1* | 11/2011 | Kulkarni | G06F 30/30 382/144 |
| 2016/0061745 | A1 | 3/2016 | Chen et al. | |
| 2016/0210526 | A1* | 7/2016 | Lee | G06F 3/048 |
| 2017/0169552 | A1* | 6/2017 | Brauer | G06T 7/001 |

OTHER PUBLICATIONS

WIPO, ISR for PCT/US2019/021725, dated Jun. 24, 2019.

\* cited by examiner

*Primary Examiner* — Tsung Yin Tsai
(74) *Attorney, Agent, or Firm* — Hodgson Russ LLP

(57) ABSTRACT

A best optical inspection mode to detect defects can be determined when no defect examples or only a limited number of defect examples are available. A signal for a defect of interest at the plurality of sites and for the plurality of modes can be determined using electromagnetic simulation. A ratio of the signal for the defect of interest to the noise at each combination of the plurality of sites and the plurality of modes can be determined. A mode with optimized signal-to-noise characteristics can be determined based on the ratios.

18 Claims, 3 Drawing Sheets

Optical patches for noise calculation

Collect optical images (Test and Reference) of wafer for n modes, collect design clip at same location

↓

Calculate difference image from test and reference image. Calculate noise based on difference images for sites 1 to m for modes 1 to n. If care areas are defined then use only the area within the CA for noise calculation.

↓

Noise of defect for site 1, mode 1 to n, ... site m, mode 1 to n

↓

Signal(site 1, mode 1) / Noise(site 1, mode 1) ... Signal(site m, mode 1) / Noise(site m, mode 1)

Simulation for signal calculation

Input model parameters for electromagnetic simulations such as materials and its n&k values, layout using design clip and thickness

↓

Run electromagnetic simulation to calculate the signal of defects at sites 1 to m for modes 1 to n

↓

Signal of defect for site 1, mode 1 to n, ... site m, mode 1 to n

↓

Signal(site m, mode n) / Noise(site m, mode n)

↓

Statistical analysis to find mode with best signal to noise characteristic

FIG. 3

COMBINING SIMULATION AND OPTICAL MICROSCOPY TO DETERMINE INSPECTION MODE

CROSS-REFERENCE TO RELATED APPLICATIONS

This application claims priority to the provisional patent application filed Mar. 13, 2018 and assigned U.S. App. No. 62/642,161, the disclosure of which is hereby incorporated by reference.

FIELD OF THE DISCLOSURE

This disclosure relates to determining an optical inspection mode.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer that are separated into individual semiconductor devices.

Finding gap defects is complicated and time-consuming. Usually gap defects are identified during an end of line investigation. Current techniques to find gap defects are to run hot scans or perform simulations. If the defect density is low, it can take a long time to find defect examples by running hot scans or relying on electron beam tools.

Determining a best optical inspection mode can be challenging when there are not enough defects of interest (DOIs) in a sample because there are not statistics to properly evaluate the optical inspection mode. Determining a best optical inspection mode also can be challenging when there are insufficient examples of noise. Simulating noise is difficult because the noise source is not known. Based on an optical image, one cannot determine if noise is, for example, line edge roughness (LER) or a nuisance in the previous layer. On a scanning electron microscope (SEM) tool, only the uppermost layer (current layer) is seen and what is in the previous layers (layer below) is not known. This means a model cannot be created to simulate noise because what the noise/nuisance actually looks like is not known.

A simulation-based approach was previously used. A model of the structures which are printed on the wafer is created. Electromagnetic simulations are run on the models and the signal intensity of the defect and of the noise is calculated. However, this simulation-based approach often fails to create a correct model of the noise structure. It is generally difficult to create a proper model of the noise and requires a substantial time investment. Typically only a subset of noise sources can be identified and the predictions frequently are wrong because the noise source is not known.

An optics selector also was previously used. The optics selector calculates signal and noise for a variety of known defects and nuisance events. The optics selector can fail when there are no DOI or only a few DOI available, which is often the case. Due to limited statistics, the best optical inspection mode can sometimes not be identified and inspections do not run at entitlement.

Running electromagnetic simulations to predict the best mode is an alternative, but this requires detailed information about the layer stack. Determining what the limiting noise source is and how to model the noise is generally difficult to perform properly.

Furthermore, optical mode selection on the tool can only be performed efficiently when defect examples are available, which is often not the case for a gap defect.

Therefore, improved systems and methods are needed to determine a best optical inspection mode to detect defects, such as gap defects.

BRIEF SUMMARY OF THE DISCLOSURE

A system is provided in a first embodiment. The system comprises a light source configured to direct a beam of light at a wafer, a detector that collects the beam of light reflected from the wafer, and a processor in electronic communication with the detector. The processor is configured to: receive test images from the detector and reference images of the wafer for a plurality of modes; determine difference images from the test images and the reference images; determine noise based on the difference images at a plurality of sites; determine a signal for a defect of interest at the plurality of sites and for the plurality of modes using electromagnetic simulation; determine a ratio of the signal for the defect of interest to the noise at each combination of the plurality of sites and the plurality of modes; and determine a mode with optimized signal-to-noise characteristics based on the ratios. The signal for the defect of interest and the noise in each of the ratios correspond to a same site and mode in the plurality of sites and the plurality of modes.

The mode with optimized signal-to-noise characteristics can be determined by examining outliers in a distribution, finding a maximum of the ratios, finding a maximum mean of the ratios, or finding a maximum median of the ratios.

A method is provided in a second embodiment. The method comprises receiving, at a processor, test images and reference images of the wafer for a plurality of modes. Difference images from the test images and the reference images are determined using the processor. Noise based on the difference images is determined at a plurality of sites using the processor. Using the processor, a signal for a defect of interest at the plurality of sites and for the plurality of modes is determined using electromagnetic simulation. A ratio of the signal for the defect of interest to the noise at each combination of the plurality of sites and the plurality of modes is determined using the processor. The signal for the defect of interest and the noise in each of the ratios correspond to a same site and mode in the plurality of sites and the plurality of modes. Using the processor, a mode with optimized signal-to-noise characteristics is determined based on the ratios.

The mode with optimized signal-to-noise characteristics can be determined by examining outliers in a distribution, finding a maximum of the ratios, finding a maximum mean of the ratios, or finding a maximum median of the ratios.

The method can further include adjusting a system to use the mode with optimized signal-to-noise characteristics. The system may be an optical inspection system for semiconductor wafers.

The test images can be within a care area.

A non-transitory computer-readable storage medium is provided in a third embodiment. The non-transitory computer-readable storage medium comprises one or more programs for executing the following steps on one or more computing devices. Difference images are determined from test images and reference images for a plurality of modes. Noise is determined based on the difference images at a plurality of sites. A signal for a defect of interest at the plurality of sites and for the plurality of modes is determined using electromagnetic simulation. A ratio of the signal for the defect of interest to the noise is determined at each combination of the plurality of sites and the plurality of modes. The signal for the defect of interest and the noise in each of the ratios correspond to a same site and mode in the plurality of sites and the plurality of modes. A mode with optimized signal-to-noise characteristics is determined based on the ratios.

The mode with optimized signal-to-noise characteristics can be determined by examining outliers in a distribution, finding a maximum of the ratios, finding a maximum mean of the ratios, or finding a maximum median of the ratios.

DESCRIPTION OF THE DRAWINGS

For a fuller understanding of the nature and objects of the disclosure, reference should be made to the following detailed description taken in conjunction with the accompanying drawings, in which:

FIG. 3 is a flowchart of another embodiment of a method in accordance with the present disclosure.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein can find a best optical inspection mode to detect defects when no defect examples or only a limited number of defect examples are available. Examples of noise on a tool can be used with DOI from simulations. An example of a DOI on the wafer is not required, which saves time and effort. Time and effort-intensive study of possible noise sources can be avoided because electromagnetic simulations and the DOI signal are used. Embodiments disclosed herein can deliver more accurate signal-to-noise numbers than previous techniques. Results can be combined with optical image data collection to estimate noise and electromagnetic simulations to determine the signal.

Combining the strengths of optical mode selection analysis with electromagnetic simulations can enhance the performance in finding the best inspection mode. Electromagnetic simulations may be used to calculate the signal of the defect of interest for every possible optical mode. Optical image collection using an optics selector type environment or pupil mapper (e.g., a tool which collects images of the entire pupil space) can be used to collect optical images where the defect is likely to occur and the noise is calculated. If care areas are used in the recipe, then the noise may only be calculated within the care areas.

Embodiments disclosed herein may be especially helpful with defects that are difficult to find, such as defects with few examples showing how the defects look optically. Small defects with optical properties that do not reflect light are one example of a type of defect that may benefit from the embodiments disclosed herein.

Figure 1:
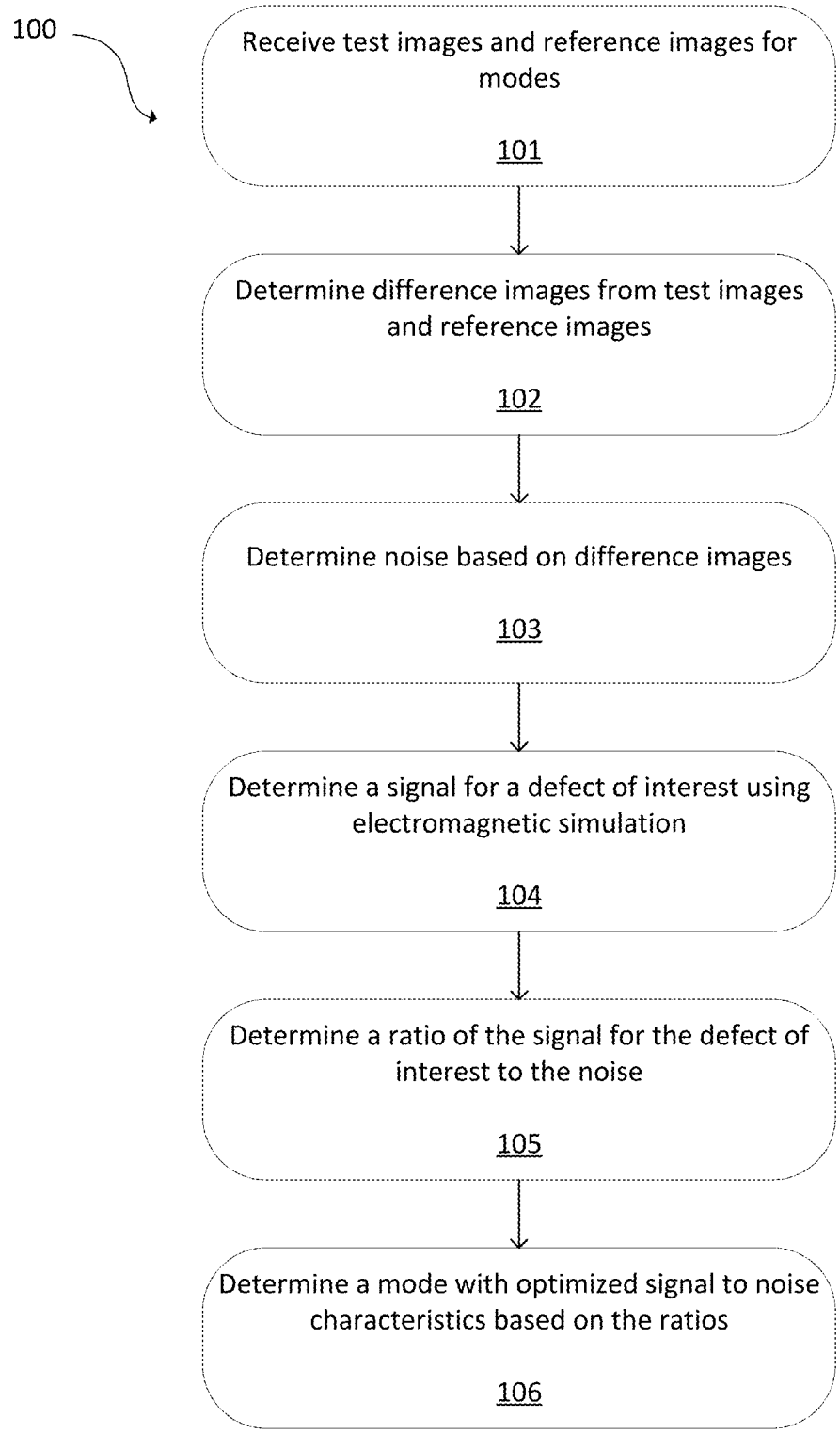
FIG. 1 is a flowchart of an embodiment of a method in accordance with the present disclosure.

FIG. 1 is a flowchart of an embodiment of a method 100. The steps of method 100 can be performed on or using a processor. At 101, test images and reference images of the wafer for a plurality of modes are received at a processor. These may be optical images of a semiconductor wafer, such as patch images, frame images, or care areas.

Difference images are determined from the test images and the reference images at 102. This can use image subtraction or other techniques.

Noise based on the difference images at a plurality of sites is determined at 103. This may be root mean square noise or other metrics. Difference grey levels in the difference image can be determined. The square root of its variance can be determined to find noise.

The noise can be calculated on patch images, frame images (which are bigger than patch images), or regions (e.g., logic, SRAM, DRAM, or certain structures).

Noise also can be determined by using standard deviation of difference image grey level between a test and a reference image, a test and a median reference image, a test and a computed reference image, or a test and a standard reference image from a reference die somewhere else on a wafer.

While root mean square noise is disclosed, other metrics are possible. For example, a Gaussian can be fitted and the standard deviation can be determined to find noise.

A signal for a DOI at the plurality of sites and for the plurality of modes is determined using electromagnetic simulation at 104. A 3D model of a structure with and without the DOI is created. Then the grey level values are predicted for a test and reference image and subtracted, which results in the difference grey level of the DOI. This can be performed for all the possible different modes. The signal may be a signal intensity number. The signal can be determined for each of the DOIs or DOI types.

One possible technique for the simulation is rigorous coupled wave analysis (RCWA), but other techniques may be used.

A ratio of the signal for the DOI to the noise at each combination of the plurality of sites and the plurality of modes is determined at 105. The signal for the DOI and the noise in each of the ratios correspond to a same site and mode in the plurality of sites and the plurality of modes.

In an instance, the ratio is calculated using the following equation.

$$\frac{\text{signal(defect location}[i], \text{mode}[j])}{\text{noise(defect location}[i], \text{mode}[j])}$$

In the previous equation, [i] represents an example site and [j] represents an example mode.

A list of modes with corresponding signal-to-noise characteristics calculated using the ratio can be determined and/or outputted.

A mode with optimized signal-to-noise characteristics is determined based on the ratios at 106. The mode with optimized signal-to-noise characteristics can be determined by examining outliers in a distribution, by finding a maximum of the ratios, by finding a maximum mean of the ratios, or by finding a maximum median of the ratios.

The mode with optimized signal-to-noise characteristics may be applied or tool settings may be adjusted to use the mode with optimized signal-to-noise characteristics. For example, a predicted optics mode can be selected in the tool's software.

In an example, a model file is loaded onto a processor and a user defines how the defect looks. The user can select certain locations on the wafer that are likely to have defects. Electromagnetic simulations can be performed for all possible modes for these locations to calculate the signal values for these defects. The stage of the tool moves to those locations for all the possible modes and the noise can be determined. A signal to noise number can be shown so that either the user or the software can find the best inspection mode.

FIG. 3 is a flowchart of another embodiment of a method. The test image in the example of FIG. 3 (designated "Test") does not need to contain a defect. Noise, such as root mean square (RMS) noise, can be defined as the square root of the mean of variances from the background region. The area of a care area (CA) may be used. The modes 1 to n can include combinations of focus offsets, polarization of light (illumination and collection part), spectral ranges, stage speeds, apertures, or other settings. The apertures can include customized apertures (e.g., accuracy). The variables n and k in FIG. 3 are optical constants.

A design clip may be collected in FIG. 3 because the design clip may have useful information or may provide an exact location.

Figure 2:
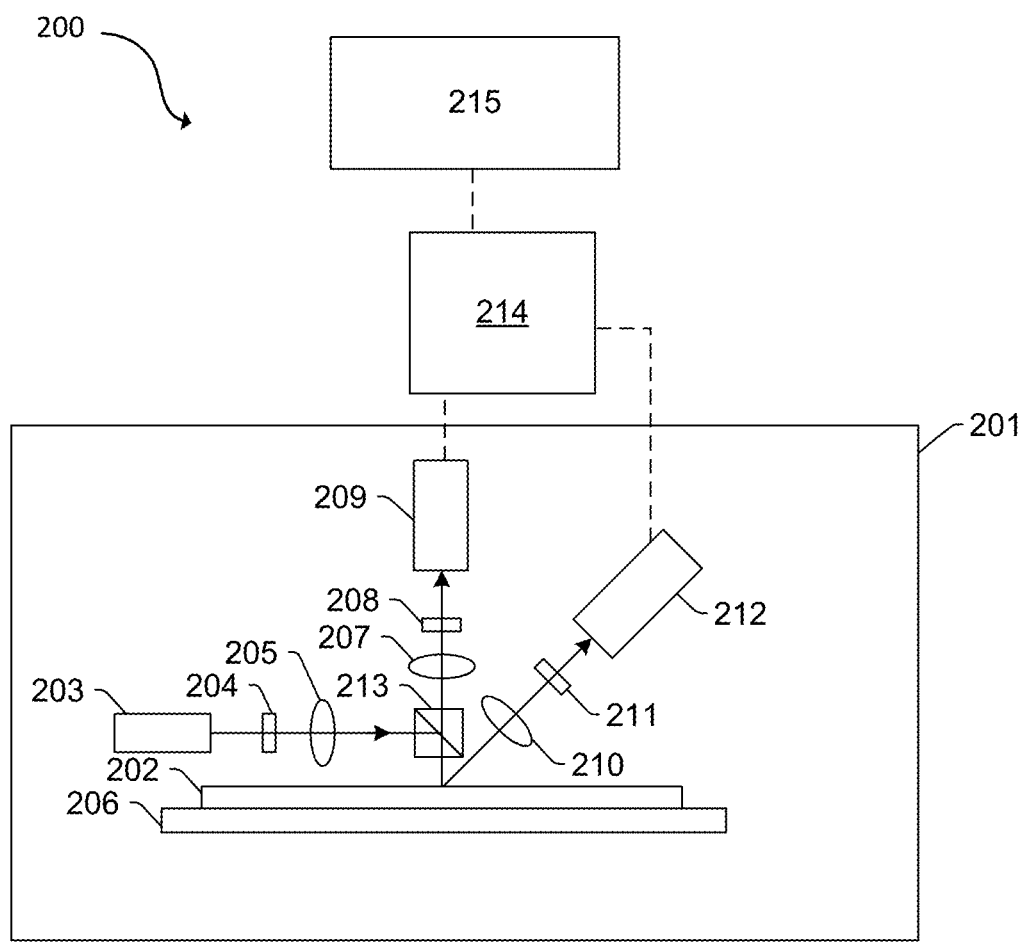
FIG. 2 is a block diagram of an embodiment of a system in accordance with the present disclosure.

FIG. 2 is a block diagram of an embodiment of a system 200. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen includes a reticle. The reticle may include any reticle known in the art.

In the embodiment of the system 200 shown in FIG. 2, optical based subsystem 201 includes an illumination subsystem configured to direct light to specimen 202. The illumination subsystem includes at least one light source. For example, as shown in FIG. 2, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 2, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical based subsystem 201 may be configured to direct the light to the specimen 202 at different angles of incidence at different times. For example, the optical based subsystem 201 may be configured to alter one or more characteristics of one or more elements of the illumination subsystem such that the light can be directed to the specimen 202 at an angle of incidence that is different than that shown in FIG. 2. In one such example, the optical based subsystem 201 may be configured to move light source 203, optical element 204, and lens 205 such that the light is directed to the specimen 202 at a different oblique angle of incidence or a normal (or near normal) angle of incidence.

In some instances, the optical based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 2 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 2) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a broadband plasma (BBP) source. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto specimen 202 by lens 205. Although lens 205 is shown in FIG. 2 as a single refractive optical element, it is to be understood that, in practice, lens 205 may include a number of refractive and/or reflective optical elements that in combination focus the light from the optical element to the specimen. The illumination subsystem shown in FIG. 2 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the specimen 202. For example, the optical based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical based subsystem 201 may be configured such that one or more optical elements of the optical based subsystem 201 perform some scanning of the light over the specimen 202. The light may be scanned over the specimen 202 in any suitable fashion such as in a serpentine-like path or in a spiral path.

The optical based subsystem 201 further includes one or more detection channels. At least one of the one or more detection channels includes a detector configured to detect light from the specimen 202 due to illumination of the specimen 202 by the subsystem and to generate output responsive to the detected light. For example, the optical based subsystem 201 shown in FIG. 2 includes two detection channels, one formed by collector 207, element 208, and detector 209 and another formed by collector 210, element 211, and detector 212. As shown in FIG. 2, the two detection channels are configured to collect and detect light at different angles of collection. In some instances, both detection channels are configured to detect scattered light, and the detection channels are configured to detect tight that is scattered at different angles from the specimen 202. However, one or more of the detection channels may be configured to detect another type of light from the specimen 202 (e.g., reflected light).

As further shown in FIG. 2, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 2 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 2 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the specimen 202. Therefore, the optical based subsystems 201 described herein may be configured for only DF, only BF, or both DF and BF imaging. Although each of the collectors are shown in FIG. 2 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 2 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with an SEM.

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be further configured as described herein.

The processor 214 may be configured according to any of the embodiments described herein. The processor 214 also may be configured to perform other functions or additional steps using the output of the system 200 or using images or data from other sources.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

In an instance, the processor 214 is in communication with the system 200. The processor 214 is configured to receive test images and reference images of the wafer for a plurality of modes. Difference images from the test images and the reference images can be determined. Noise based on the difference images at a plurality of sites can be determined. A signal for a defect of interest at the plurality of sites and for the plurality of modes using electromagnetic simulation can be determined. A ratio of the signal for the defect of interest to the noise at each combination of the plurality of sites and the plurality of modes can be determined. The signal for the defect of interest and the noise in each of the ratios correspond to a same site and mode in the plurality of sites and the plurality of modes. A mode with optimized signal-to-noise characteristics based on the ratios can be determined.

An additional embodiment relates to a non-transitory computer-readable medium storing program instructions executable on a controller for performing a computer-implemented method for determining a mode, as disclosed herein. In particular, as shown in FIG. 2, electronic data storage unit 215 or other storage medium may contain non-transitory computer-readable medium that includes program instructions executable on the processor 214. The computer-implemented method may include any step(s) of any method(s) described herein, including method 100 or the embodiment of FIG. 2. The detector 212 can provide the test images.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a light source configured to direct a beam of light at a wafer;
a detector that collects the beam of light reflected from the wafer; and
a processor in electronic communication with the detector, wherein the processor is configured to:
receive test images from the detector and reference images of the wafer for a plurality of modes;
determine difference images from the test images and the reference images;
determine noise based on grey levels in the difference images at a plurality of sites;
determine a signal intensity for a defect of interest at the plurality of sites and for the plurality of modes using electromagnetic simulation, wherein the electromagnetic simulation, for the plurality of modes, determines predicted grey level values for one of the test images and one of the reference images and subtracts the predicted grey level values for the one of the test images and the one of the reference images whereby a difference grey level of the defect of interest is determined;
determine a ratio of the signal intensity for the defect of interest to the noise at each combination of the plurality of sites and the plurality of modes, wherein the signal intensity for the defect of interest and the noise in each of the ratios corresponds to a same site and mode in the plurality of sites and the plurality of modes; and
determine a mode with optimized signal-to-noise characteristics based on the ratios.

2. The system of claim 1, wherein the mode with optimized signal-to-noise characteristics is determined by examining outliers in a distribution.

3. The system of claim 1, wherein the mode with optimized signal-to-noise characteristics is determined by finding a maximum of the ratios.

4. The system of claim 1, wherein the mode with optimized signal-to-noise characteristics is determined by finding a maximum mean of the ratios.

5. The system of claim 1, wherein the mode with optimized signal-to-noise characteristics is determined by finding a maximum median of the ratios.

6. A method comprising:
receiving, at a processor, test images and reference images of the wafer for a plurality of modes;
determining difference images from the test images and the reference images using the processor;
determining noise based on grey levels in the difference images at a plurality of sites using the processor;
determining, using the processor, a signal intensity for a defect of interest at the plurality of sites and for the plurality of modes using electromagnetic simulation, wherein the electromagnetic simulation, for the plurality of modes, determines predicted grey level values for one of the test images and one of the reference images and subtracts the predicted grey level values for the one of the test images and the one of the reference images whereby a difference grey level of the defect of interest is determined;
determining, using the processor, a ratio of the signal intensity for the defect of interest to the noise at each combination of the plurality of sites and the plurality of modes, wherein the signal intensity for the defect of interest and the noise in each of the ratios corresponds to a same site and mode in the plurality of sites and the plurality of modes; and
determining, using the processor, a mode with optimized signal-to-noise characteristics based on the ratios.

7. The method of claim 6, wherein the mode with optimized signal-to-noise characteristics is determined by examining outliers in a distribution.

8. The method of claim 6, wherein the mode with optimized signal-to-noise characteristics is determined by finding a maximum of the ratios.

9. The method of claim 6, wherein the mode with optimized signal-to-noise characteristics is determined by finding a maximum mean of the ratios.

10. The method of claim 6, wherein the mode with optimized signal-to-noise characteristics is determined by finding a maximum median of the ratios.

11. The method of claim 6, further comprising adjusting a system to use the mode with optimized signal-to-noise characteristics.

12. The method of claim 11, wherein the system is an optical inspection system for semiconductor wafers.

13. The method of claim 6, wherein the test images are within a care area.

14. A non-transitory computer-readable storage medium, comprising one or more programs for executing the following steps on one or more computing devices:
determine difference images from test images and reference images for a plurality of modes;
determine noise based on grey levels in the difference images at a plurality of sites;
determine a signal intensity for a defect of interest at the plurality of sites and for the plurality of modes using electromagnetic simulation, wherein the electromagnetic simulation, for the plurality of modes, determines predicted grey level values for one of the test images and one of the reference images and subtracts the predicted grey level values for the one of the test images and the one of the reference images whereby a difference grey level of the defect of interest is determined;
determine a ratio of the signal intensity for the defect of interest to the noise at each combination of the plurality of sites and the plurality of modes, wherein the signal intensity for the defect of interest and the noise in each of the ratios corresponds to a same site and mode in the plurality of sites and the plurality of modes; and
determine a mode with optimized signal-to-noise characteristics based on the ratios.

15. The non-transitory computer-readable storage medium of claim 14, wherein the mode with optimized signal-to-noise characteristics is determined by examining outliers in a distribution.

16. The non-transitory computer-readable storage medium of claim 14, wherein the mode with optimized signal-to-noise characteristics is determined by finding a maximum of the ratios.

17. The non-transitory computer-readable storage medium of claim 14, wherein the mode with optimized signal-to-noise characteristics is determined by finding a maximum mean of the ratios.

18. The non-transitory computer-readable storage medium of claim 14, wherein the mode with optimized signal-to-noise characteristics is determined by finding a maximum median of the ratios.

* * * * *